United States Patent [19]

McWhirter et al.

[11] Patent Number: 5,235,537
[45] Date of Patent: Aug. 10, 1993

[54] DIGITAL PROCESSOR FOR TWO'S COMPLEMENT COMPUTATIONS

[75] Inventors: John G. McWhirter; Jeremy S. Ward, both of Worcestershire, England; Simon C. Knowles, Gwent, Wales

[73] Assignee: The Secretary of State for Defence in Her Britannic Majesty's Government of the United Kingdom of Great Britain and Northern Ireland, London, England

[21] Appl. No.: 768,887

[22] PCT Filed: May 2, 1990

[86] PCT No.: PCT/GB90/00674
§ 371 Date: Oct. 29, 1991
§ 102(e) Date: Oct. 29, 1991

[87] PCT Pub. No.: WO90/13867
PCT Pub. Date: Nov. 15, 1990

[30] Foreign Application Priority Data

May 12, 1989 [GB] United Kingdom ............... 8910960

[51] Int. Cl.$^5$ .............................................. G06F 7/52
[52] U.S. Cl. .................................... 364/736; 364/754
[58] Field of Search ..................... 364/736, 754, 746.2

[56] References Cited

U.S. PATENT DOCUMENTS

4,493,048 1/1985 Kung et al. ........................ 364/754
4,777,614 10/1988 Ward ................................. 364/754

FOREIGN PATENT DOCUMENTS

2168509 3/1986 United Kingdom ................ 364/754

OTHER PUBLICATIONS

Electronic Letters, vol. 23, No. 9, Apr. 23, 1987, R. A. Evans et al., "Modified Bit-level Systolic Inner Product/Convolver Architecture With Increased Throughput", pp. 460-461.

Microprocessing and Microprogramming, vol. 20, Nos. 1-3, Apr. 1987, North-Holland (Amsterdam, NL), O. Bruschi et al., "Systolic Arrays for Serial Signal Processing", pp. 133-140.

G.E.C. Journal of Research, vol. 2, No. 1, 1984, R. B. Urquhart et al., "Efficient Bit-Level Systolic Arrays for Inner Product Computation", pp. 52-55.

Primary Examiner—Long T. Nguyen
Attorney, Agent, or Firm—Nixon & Vanderhye

[57] ABSTRACT

A digital processor for two's complement computations incorporates an array of multiplier cells each having the one-bit gated full adder logic function. The array has nearest-neighbour connections containing clock-activated latches for bit propagation. On each clock cycle, the cells receive input data, carry and cumulative sum bits. Each cell adds the carry and cumulative sum bits to the product of the data bit and a respective digit associated with the relevant cell. Data bits pass along array rows and sum bits accumulate in cascade down array columns. Carry bits are recirculated. Each coefficient digit is expressed as a sign bit and at least one magnitude bit consisting of or including a level bit. Each cell includes logic gates responsive to the sign and level bits, and carry a feedback latch and multiplier combination responsive to a least significant data bit flag to substitute the sign bit for a carry feedback bit. Each coefficient digit may include an additional magnitude bit expressed as a shift bit and employed to select multiplicand data bit significance, the logic gates being responsive to flag bits to eliminate unwanted sign extension bit products. The processor may include accumulator cells incorporating gates responsive to flag bits and arranged to eliminate unwanted result sign extension bits.

11 Claims, 10 Drawing Sheets

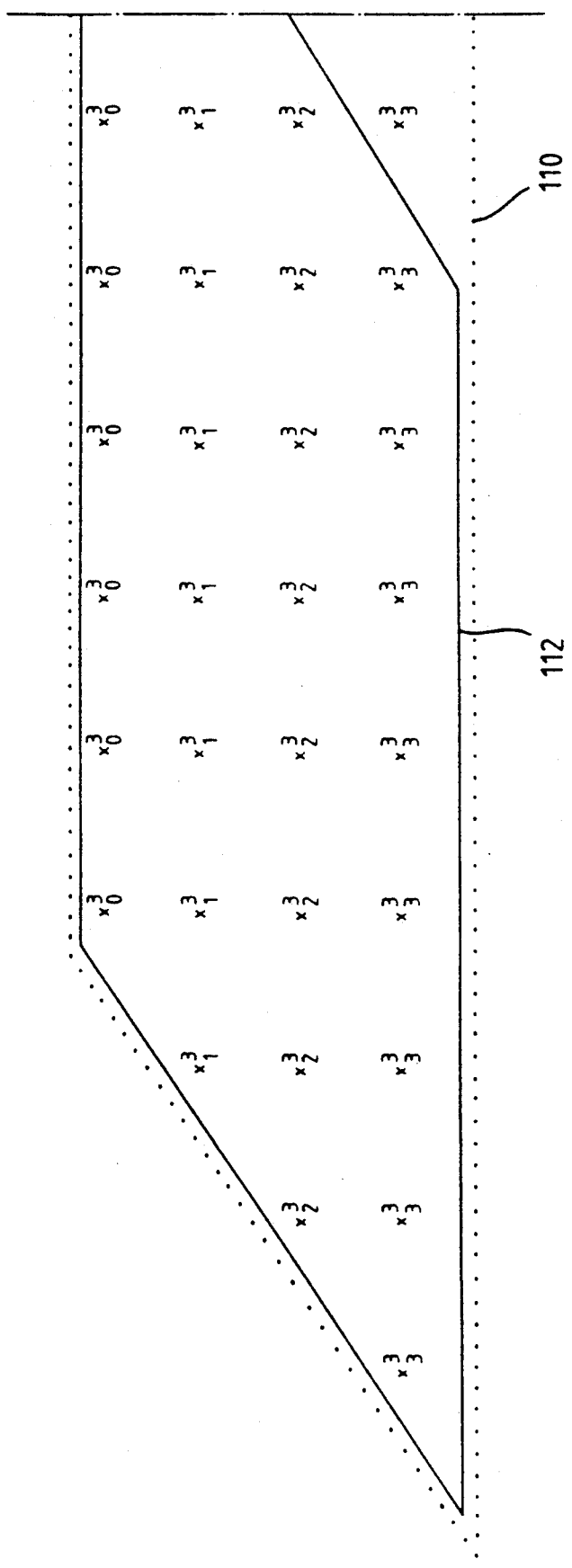

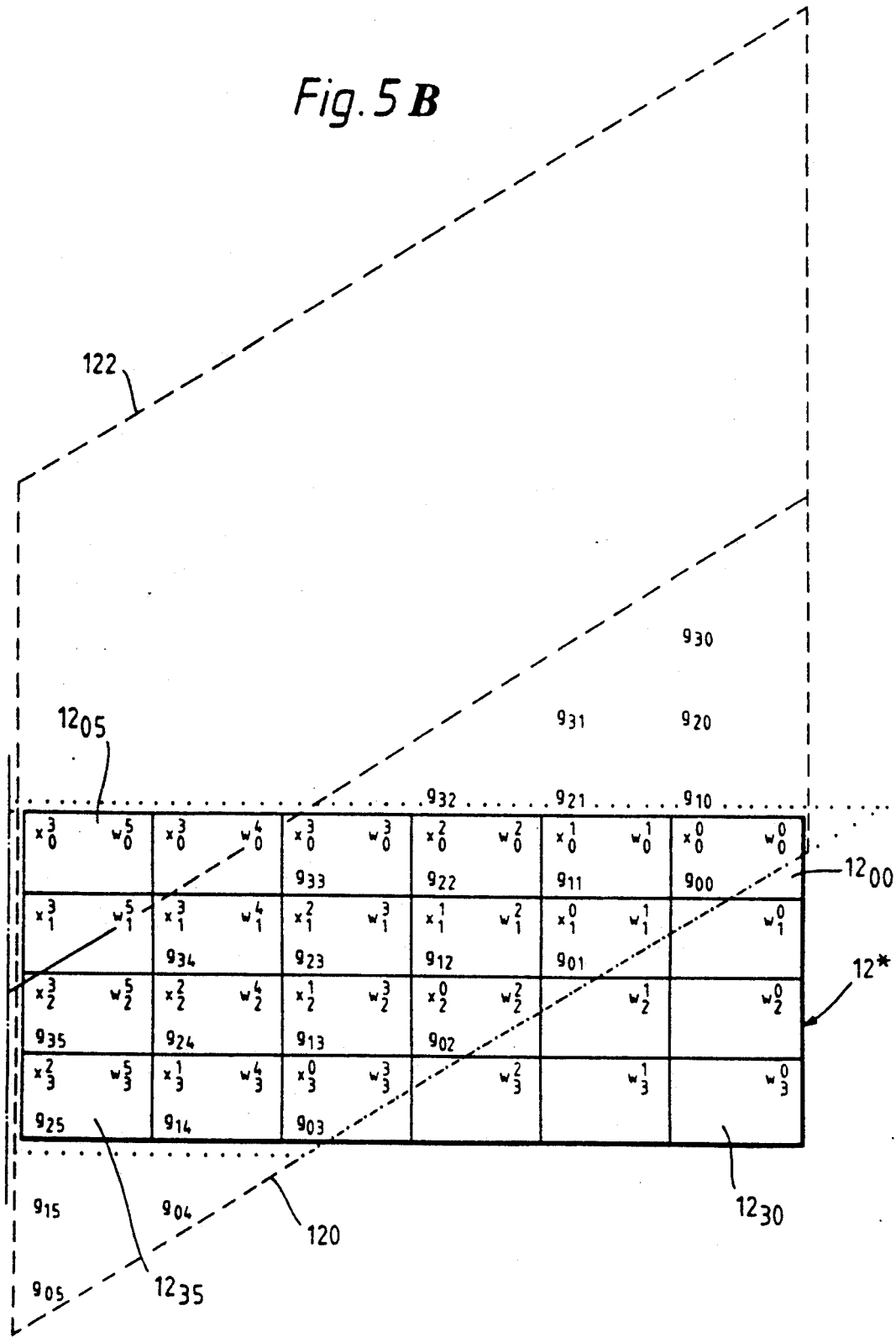

DIGITAL PROCESSOR FOR TWO'S COMPLEMENT COMPUTATIONS

BACKGROUND OF THE INVENTION

1. Field of the Invention

This invention relates to a digital processor for two's complement computations, and more particularly to a processor of the kind incorporating an array of individual logic cells operating on single bit input. Arrays of this kind are referred to as "bit-level systolic arrays".

2. Discussion of Prior Art

Bit-level systolic arrays are known in the prior art, and are described in for example British Patent No. 2,106,287 B (Ref (1)), (U.S. Pat. Nos. 4,533,993 and 4,639,857). In FIG. 7 et sequi, Ref (1) describes the basic features of one form of bit-level systolic array for matrix-vector multiplication. The FIG. 7 device consists of a rectangular array of individual logic cells each connected to its row and column neighbours. Each cell has a specified logic function, but no gate level constructional details are given. The array includes intercell clocked latches for bit storage and advance along array rows and down array columns. Each cell evaluates the product of input data and coefficient bits received from neighbouring cells. The product is added to input carry and cumulative sum bits. The manner in which bits propagate through the array is governed by the form of computation to be executed. In Ref (1), FIG. 7 relates to multiplication of a vector X by a matrix W to form a product vector Y, the matrix W having coefficients with a value of $+1$ or $-1$. The vectors X and Y represent digital numbers in two's complement form.

The matrix W is input to a first array edge one diagonal per clock cycle. Successive coefficients of X are input to a second array edge orthogonal to the first and in a bit parallel, word serial bit staggered manner; i.e. bits of like significance of different coefficients are input in succession to the respective row, but bits of each word with significance differing by one are input to adjacent rows with a time delay of one clock cycle per row. Coefficient bits propagate along array rows, and are multiplied by successive matrix coefficients to provide contributions to product vector element bits at a third array edge. Carry bits pass between adjacent cells evaluating bits one level higher in significance.

FIG. 9 of Ref (1) relates to a logic cell suitable for use with the FIG. 7 array, and extending its application to multiplication by a matrix of coefficients $+1$, $-1$ or 0. This requires two bits to define each matrix coefficient as opposed to one bit previously. Each cell has extra inputs to accommodate this. However, no gate level constructional details of the logic cells are given.

FIG. 15 of Ref (1) relates to a processor for executing a convolution operation, i.e. a convolver. It operates on all positive input data and coefficients, and comprises a rectangular array of gated full adder logic cells with row and column connections; i.e. each cell comprises a full adder with an AND gate connected to one input to act as a multiplier of two input bits. Data and coefficient bits propagate in counter flow along array rows, and product bits are accumulated in cascade down array columns. The array is connected to a full adder array arranged to sum contributions to like convolution results. To avoid the generation of unwanted bit-level partial products, individual bits of each word are separated by zeros. This means that part of the array is idle at any given time, since some of the cells are computing zero products.

British Patent No. 2,144,245 B (corresponding to U.S. Pat. No. 4,686,645 (Ref (2)) relates to a bit-level systolic array for matrix-matrix multiplication. It employs an array of gated full adder logic cells with row and column connections as in Ref (1), FIG. 15. Each cell recirculates its output carry bit to its carry input, since it computes bits in ascending order of significance on successive cycles. Multiplicand matrices move in counterflow along array rows. Contributions to product matrix elements accumulate down array columns. The contributions are grouped appropriately by array output adder trees, which are switchable for separation of different matrix elements.

The use of so-called "guard bands" is described in Ref (2). This relates to the extension of input numbers with extra zero bits to allow for output product terms to have greater length without overlap between adjacent terms. It is commonly referred to as "word growth". Ref (2) largely relates to computations involving all positive numbers, but FIG. 9 illustrates an array cell suitable for processing two's complement numbers. It is a gated full adder as before, and includes a control line to provide for appropriate products to be complemented. In addition, extra electronic components are required to be added to the array output accumulator to introduce a correction factor. The array in fact produces erroneous results, and a correction term must be applied by the output accumulator. This term has the value $2^m - 2^{2m-1}$ in the case of multiplication of two words each of m bits. This implementation of two's complement arithmetic arises from the Baugh-Wooley algorithm. However, Ref (2) does not provide a gate level description of the array logic cell construction required to implement complementation of negatively weighted partial products.

British Patent No. 2,147,721 B (Ref (3)) (corresponding to U.S. Pat. No. 4,701,876) relates to a bit-level systolic array for matrix-vector multiplication. It is addressed to the problem of reducing the number of array logic cells which are effectively idle. Ref (3) employs switchable array output accumulation and cell clocking arranged to provide for bit movement in adjacent rows on alternative cycles. By this means, full cell utilisation is achieved. As in Refs (1) and (2), the array is rectangular and multiplicand bits move in counterflow along array rows. In addition, as in Ref (2), carry bits are recirculated on respective cells, and guard bands are employed to extend input digital words to provide for output word growth.

In order to provide for two's complement computation, Ref (3) envisages the use of a control line to complement appropriate products. In addition, output accumulation is to be corrected for the presence of unwanted terms. Here again, there is no gate level description of an array logic cell for two's complement arithmetic.

More recent prior art in the bit-level systolic array area relates to the use of stationary multiplicand coefficients each associated with a respective array logic cell. This is discussed by Urquhart and Wood in the GEC Journal of Research, Vol. 2, No. 1, 1984, Ref (4). It is implemented in published British Patent Application Nos. 2,168,509 A, (corresponding to U.S. Pat. No. 4,777,614) 2,187,579 A (corresponding to U.S. Pat. No. 4,885,715) and 2,192,474 A (corresponding to U.S. Pat. No. 4,833,635) (Refs (5), (6) and (7)). Of these, only Ref (5) addresses the problem of two's complement multiplication. It relates to matrix/vector multiplication in the special case when the matrix coefficients are restricted to the values +1, 0 and −1. It observes that multiplication by +1 and 0 are straightforward, but that multiplication by −1 is more complex. The latter requires bits to be complemented and 1 added to least significant bits. However, Ref (5) merely specifies a logic function required to implement this procedure, no gate level description of such a cell is given.

The foregoing prior art demonstrates a general problem in bit-level systolic arrays, that of dealing efficiently with input data which may be positive or negative. There is no difficulty with all positive input data. As has been said, the prior art approach to dealing with positive and negative data has been to employ the Baugh-Wooley algorithm. This is undesirably complex for two reasons, these being the need to use control bits and the need to correct the accumulator. Futhermore, where guard bands are necessary, these must contain zeros, which conflicts with two's complement arithmetic and conventional digital circuits adapted for it. In two's complement arithmetic, the word length of a number is increased by replicating the most significant (sign) bit; i.e. 101 would be extended in five bits to 11101. In consequence, conventional digital arithmetic circuits arranged to receive sign extended inputs and generate sign extended outputs are inappropriate. In practice, bit-level systolic arrays employing the Baugh-Wooley algorithm have used specially adapted circuits which are undesirably complex.

SUMMARY OF THE INVENTION

It is an object of the invention to provide a digital processor for two's complement computations.

The present invention provides a digital processor for two's complement computations, and wherein:

(a) the processor includes an array of multiplier cells each arranged to receive input data, carry and cumulative sum bits, to compute new cumulative sum and carry bits corresponding to addition of the input sum and carry bits to a product of the input data bit and a respective coefficient and to output the data bit and the computed cumulative sum bit, and to output the computed carry bit for addition in a subsequent computation, (b) the cells are connected to form rows and columns by interconnection lines containing clock-activated latches for bit storage and advance, the lines and latches providing for computed cumulative sum bits to move down columns and data bits to move along rows, (c) the processor includes data input means for bit serial input of data words to respective rows with input delay increasing down the array, and (d) the cells are responsive to a respective flag bit input with each data word and indicating least significant bit occurrence, characterised in that each cell's coefficient is a digit encoded and stored in the form of a sign bit and at least one magnitude bit, and each cell includes multiplicative gating means responsive to the sign and magnitude bits, and means responsive to the flag bit for controlling the input carry bit value in accordance with the sign bit in computations involving least significant data bits.

The invention provides the advantage that it accepts data and produces output in two's complement form, employs coefficients which may be positive or negative, and, by input carry bit control, avoids unwanted terms arising from unnecessary sign extension bits.

Conveniently, carry bit control may be implemented by substitution of the sign bit for carry bits in computations involving least significant bits.

The invention may be employed for matrix-vector multiplication where the matrix has elements provided by individual cell coefficients. Alternatively, the invention may be used to generate sums of vector/coefficient products by providing accumulating means to add computed cumulative sum bits of like bit significance output from different array columns to form result bits. In this case, the accumulating means is responsive to flag bit input to implement deletion of unwanted bits of unnecessarily high significance arising from sign extension. The accumulating means may comprise one accumulator cell per column, the cell including a full adder arranged to add the respective column output to that received with relative delay from a neighbouring accumulator cell, and to provide input to a second neighbouring accumulator cell. The full adder has gated inputs responsive to flag bits to provide for deletion of unwanted bits.

Each multiplier cell preferably comprises storing means for a sign bit and a magnitude-indicating level bit, an AND gate to receive the input data bit and the level bit, and an EXOR gate to receive the AND gate output and the sign bit and provide a product bit for addition to the input sum and carry bits. The AND and EXOR gates may alternatively be exchanged with equivalent effect. Substitution of the sign bit for the input carry bit may be implemented by multiplexing means responsive to flag bits.

Each cell's coefficient may be a digit encoded and stored in the form of a sign bit and two magnitude bits consisting of a level bit and a shift bit. In this case, the multiplicative gating means is responsive to the sign and level bits for product generation, to the shift bit for selection of multiplicand data bit significance, and to flag bits for elimination of unwanted products involving input data sign extension bits.

BRIEF DESCRIPTION OF THE DRAWINGS

In order that the invention might be more fully understood, embodiments thereof will now be described, by way of example only, with reference to the accompanying drawings, in which:-

FIGS. 4, 5A and 5B schematically illustrate timing of data input and intermediate sum formation in the FIG. 1 processor;

DETAILED DESCRIPTION OF THE PREFERRED EMBODIMENTS

Figure 1:
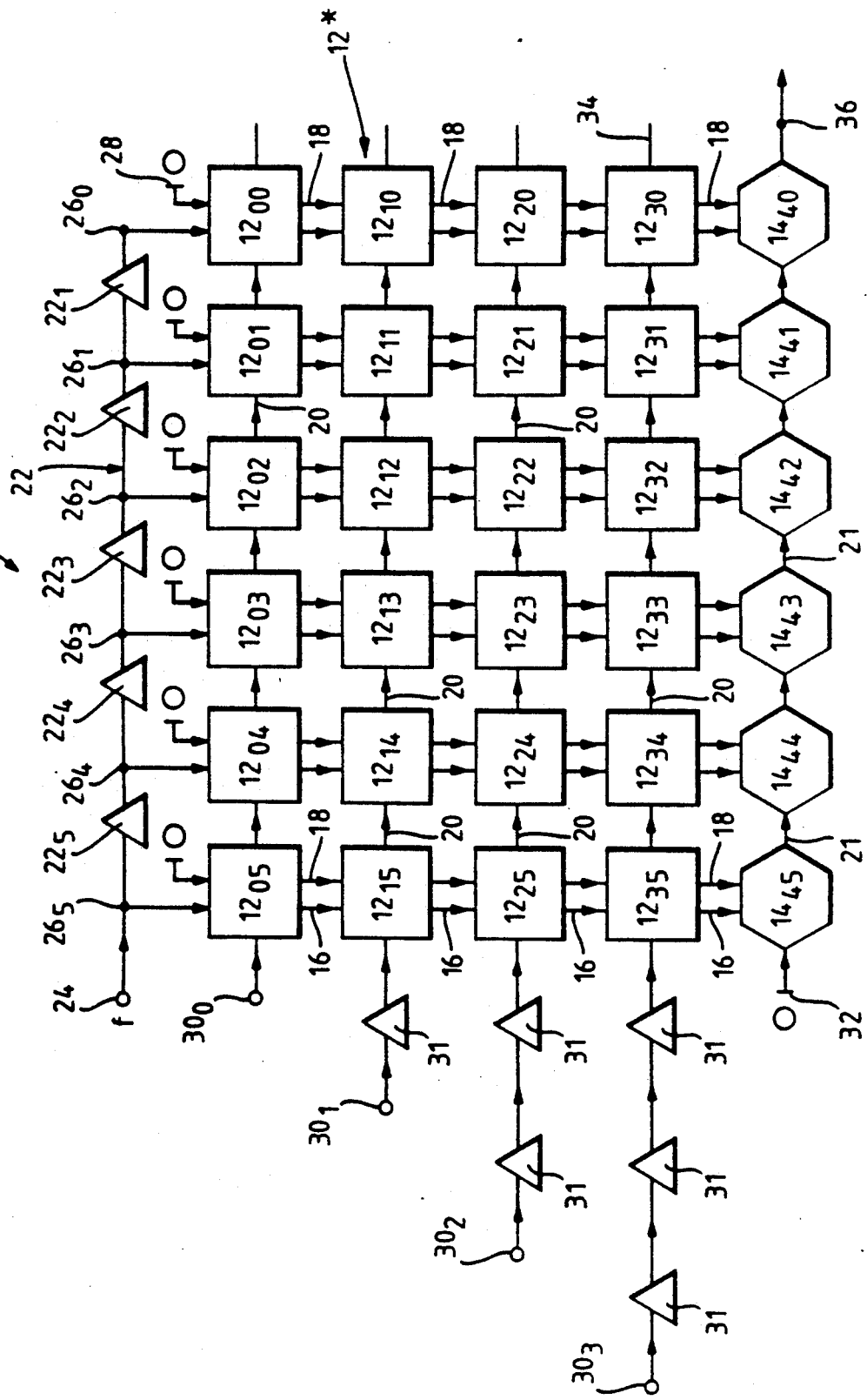
FIG. 1 is a schematic block diagram of a digital processor of the invention.

Referring to FIG. 1, a digital processor 10 of the invention for two's complement computations is shown schematically. The processor 10 incorporates four rows of multiplier cells 12 indicated by squares, each row having six such cells. The cells 12 are also arranged in six columns, and form an array indicated collectively by 12*. The columns terminate at respective accumulator cells indicated by hexagons 14. The cells bear subscript indices i,j indicating row and column positions; i.e. cell $12_{ij}$ is the jth cell in the ith row (i=0 to 3, j=0 to 5). Accumulator cells $14_{40}$ to $14_{45}$ form a fifth processor row. The column index j increases in the right to left direction, so that cells $12_{i0}$ (i=0 to 3) and $14_{40}$ are the rightmost cells. As will be described later, this is convenient for conformity with significance of multiplicative coefficient digits associated with respective multiplier cells.

The cells 12 and 14 are connected to their column neighbours by pairs of connections such as 16,18, and to their row neighbours by individual connections such as 20 and 21. Not all connections of the kind 16,18,20 or 21 are referenced to reduce illustrational complexity. A chain 22 of latches $22_1$ to $22_5$ is connected to a least significant bit (lsb) flag (f) input 24, the latches being indicated by $\Delta$ symbols. The latch chain 22 provides column first inputs $26_0$ to $26_5$ separated by intervening latches. The columns have second inputs such as 28 to the rightmost column, these inputs being set to zero as indicated.

The multiplier cell rows have inputs $30_0$ to $30_3$ connected to respective leftmost multiplier cells $12_{05}$ to $12_{35}$ via zero to three latches indicated by $\Delta$ symbols 31; i.e. the ith row input $30_i$ is connected to multiplier cell $12_{i5}$ via i latches (i=0 to 3). The lowermost row of accumulator cells 14 has an input 32 connected to zero. The rows of multiplier cells 12 have unconnected outputs such as 34, and the accumulator row has an output 36 providing computation results.

Figure 2:
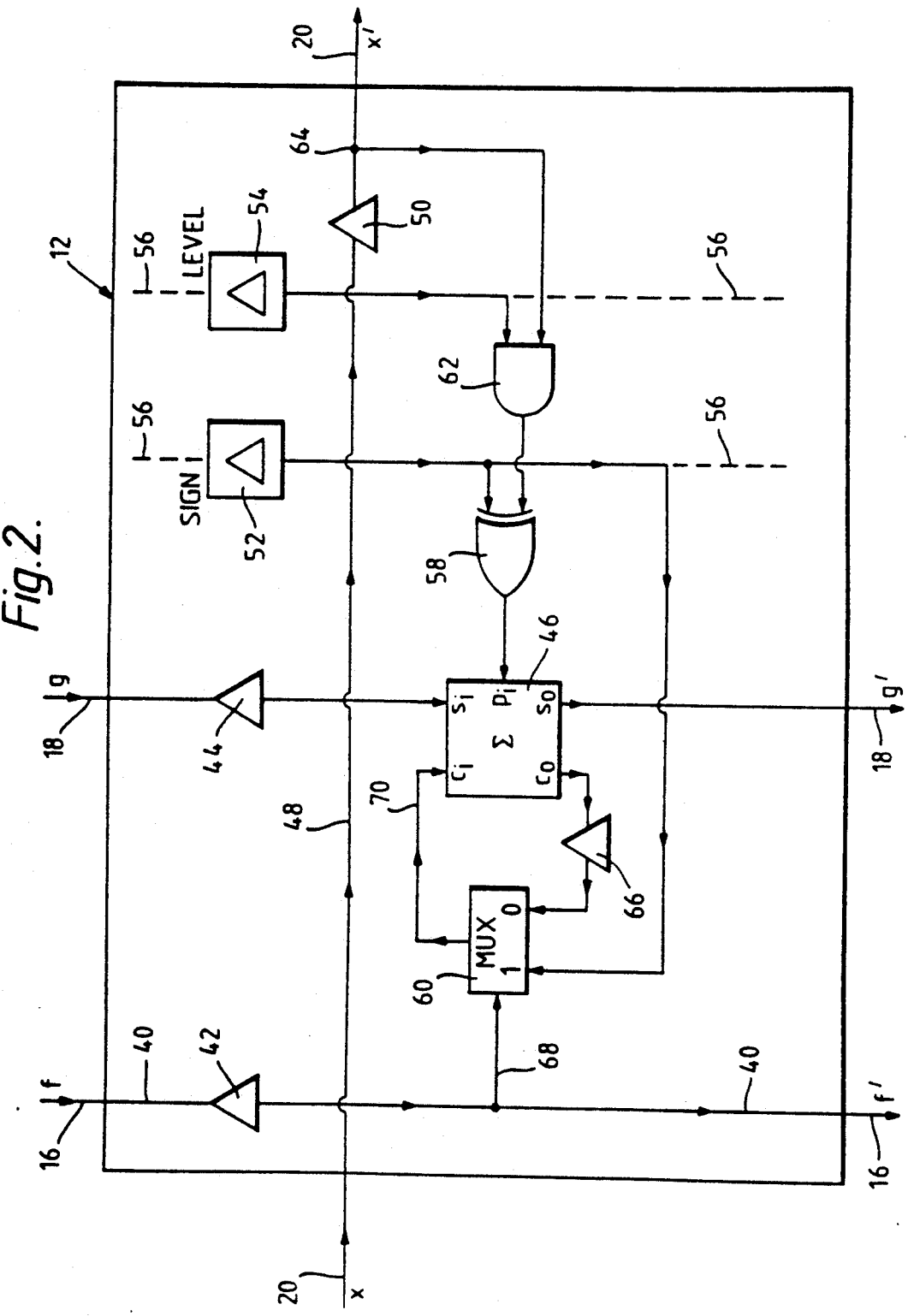
FIGS. 2 and 3 illustrate in more detail multiplier and accumulator cells shown in FIG. 1.

Referring now also to FIG. 2, in which parts previously described are like referenced, the structure of each multiplier cell 12 is shown in more detail. It incorporates a vertical through connection line 40 containing an internal latch 42 and linking an upper cell column interconnection line 16 to a lower equivalent. An upper cell interconnection line 18 is connected via a latch 44 to a partial sum input $s_i$ of a full adder 46. The adder has a partial sum output $s_o$ connected to a lower cell interconnection line 18. Row interconnection lines 20 either side of the cell 12 are linked by a horizontal through connection 48 containing a latch 50. The cell 12 also contains two coefficient storage latches 52 and 54 indicated by $\Delta$ symbols within squares. The storage latches 52 and 54 contain respective preloaded bits indicating the SIGN (+ or −) and LEVEL (magnitude) of the cell multiplier coefficient. Each column's storage latches 52 and 54 may be connected in series as indicated by chain lines 56 to facilitate loading of multiplier coefficients prior to processor operation.

The SIGN latch 52 provides a first input signal to an EXOR gate 58 and also a 1-selected input to a multiplexer 60. The LEVEL latch 54 provides a first input signal to an AND gate 62, this gate receiving a second input signal from the output 64 of the latch 50. The AND gate output signal is the second input signal to the EXOR gate 58, whose output is fed to a product input $p_i$ of the full adder 46. (The AND and EXOR gates could in fact be exchanged without affecting their combined binary logic function.) The adder 46 has a carry output $c_o$ connected via a feedback latch 66 to a 0-selected input of the multiplexer 60. A connection 68 to the line 40 provides a selector signal to the multiplexer 60 governing which of its inputs is to be output on a line 70 to a carry input $c_i$ of the adder 46.

Figure 3:
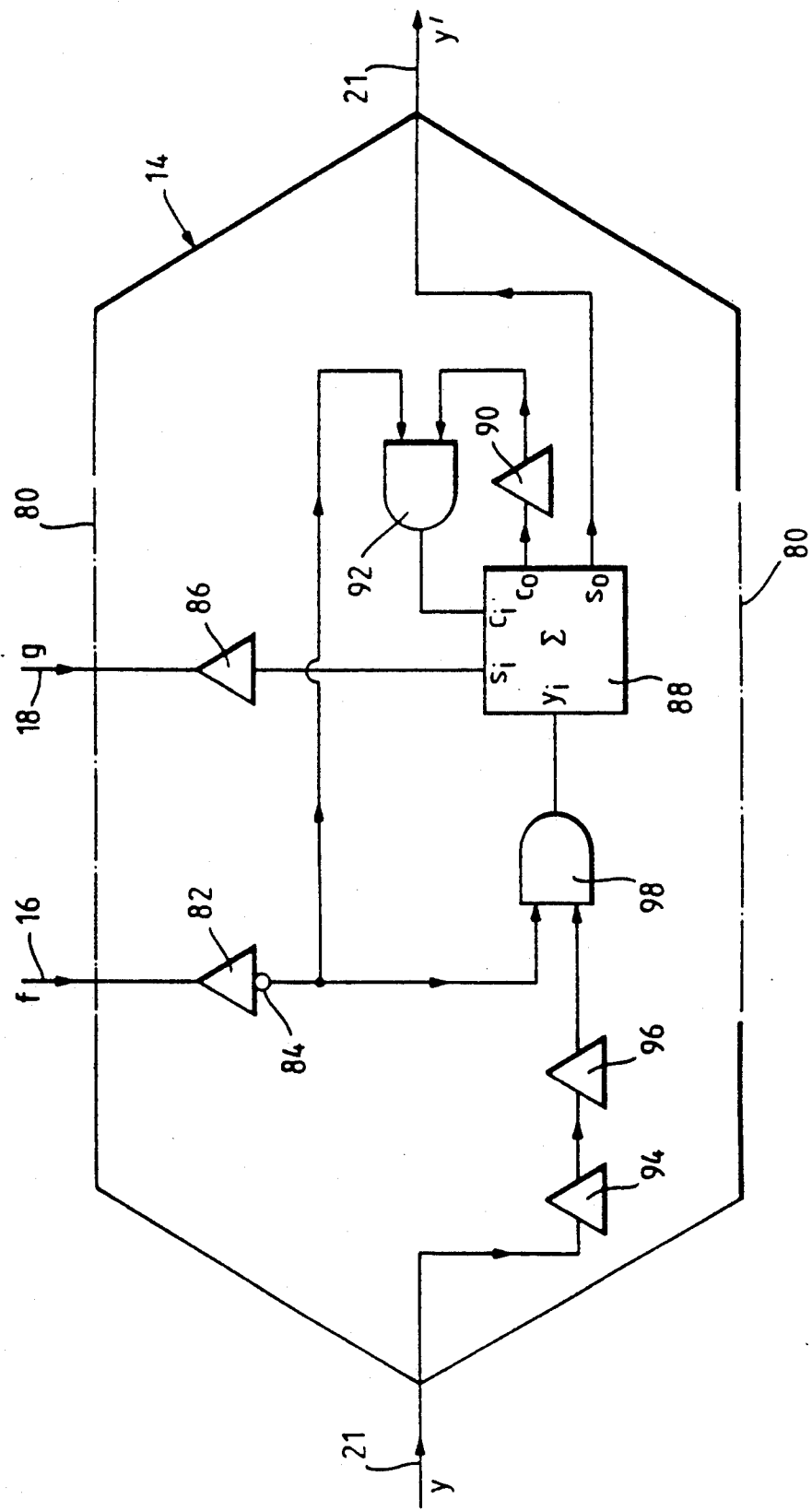

Referring now also to FIG. 3, in which parts previously described are like-referenced, the structure of each accumulator cell 14 is shown in more detail. The cell is depicted longitudinally extended as indicated by chain lines 80 to facilitate illustration of circuitry.

The cell interconnection line 16 is connected to a latch 82 having an inverted output 84. The second or right hand cell interconnection line 18 is connected via a latch 86 to a sum input $s_i$ of an adder 88. The adder 88 has a carry output $c_o$ connected via a latch 86 to a sum input input $s_i$ of an adder 88. The adder 88 has a carry output $c_o$ connected via a latch 90 to a first input of an AND gate 92, a second input to the gate 92 being furnished by the inverting latch output 84. The output of the AND gate 92 is fed to the adder carry input $c_i$. A left hand row interconnection line 21 is connected via two latches 94 and 96 to a first input of an AND gate 98, and a second input of this gate is connected to the inverting latch output 84. The AND gate 98 provides a signal to an accumulating sum input $y_i$ of the adder 88. The sum output $s_o$ of the adder 88 is connected to the right hand row interconnection line 21.

The mode of operation of the processor 10 of FIGS. 1 to 3 will now be described. Initially, the description will be directed to operation at the individual cell level, and subsequently overall result accumulation will be addressed.

The general multiplier cell $12_{ij}$ (i=0 to 3, j=0 to 5) in FIG. 1 is associated with a multiplicative coefficient digit $w_i^j$ having a value of −1, 0 or 1. In other words, instead of employing the conventional binary digit set of 0, 1 for $w_i^j$, the digit set −1, 0, 1 is employed in accordance with Booth's algorithm coding. The value of $w_i^j$ is expressed by SIGN and LEVEL bits retained in preloaded storage latches 52 and 54. The SIGN bit is 0 or 1 according to whether $w_i^j$ is positive or negative, and the LEVEL or magnitude bit is 0 or 1 according to whether $w_i^j$ is 0 or ±1 respectively. The ith row of multiplier cells $12_{i0}$ to $12_{i5}$ is associated with coefficient digits $w_i^0$ to $w_i^5$ forming in combination the ith coefficient word $W_i$ (i=0 to 3).

Each multiplier cell $12_{ij}$ receives an input bit (binary digit, value 0 or 1) of the kind x on its horizontal line 20, clocks x into its latch 50, and then in effect multiplies it by the LEVEL bit stored in latch 54. The AND gate 62 acts as a one-bit multiplier in this regard. The cell $12_{ij}$ implements the gated full adder logic function, in common with known devices in the prior art of bit-level systolic arrays. However, it implements this function in a different and advantageous manner as follows. If the SIGN bit stored in latch 52 is 0 indicating that the relevant coefficient digit $w_{ihu\ j}$ is positive, the EXOR gate 58 provides an output signal of 0 or 1 according to whether the one-bit (intermediate) product output from AND gate 62 is 0 or 1. Consequently, the product input at $p_i$ to the adder 46 is the product of the LEVEL bit and the data bit x when the SIGN bit is zero. When $w_i^j$ is negative, the SIGN bit is 1, and the output of EXOR gate 58 is 0 or 1 according to whether the output of AND gate 62 is 1 or 0; i.e. the input signal at $p_i$ is now the inverse of the product bit output from AND gate 62. Moreover, the SIGN bit is also routed to the 1-selected input of the multiplexer 60. If the flag bit f currently held in latch 42 is 1 indicating that the cell 12 is operating on a least significant data bit (lsb) $x_n^0$, the multiplexer 60 receives f=1 on line 68 and routes the SIGN bit as a carry input at $c_i$ via line 70. Consequently a flag f of 1 combined with a (negative) SIGN bit of 1 results in a carry input $c_i$ of 1 synchronously with a $p_i$ input equal to the inverse of the product bit from AND gate 62. This implements the two's complement rule of multiplying by −1 (negation) by inverting bits and adding 1 to the lsb.

The multiplexer 60 also provides for the deletion of unwanted carry bits. This arises as follows. As will be described later in more detail, the processor 10 is designed to receive input data words X incorporating bits of the kind x. Each word X has its most significant bit replicated to form a two's complement sign extension guard band. The result of this is that a final bit of one data word X gives rise to an unwanted carry bit recirculated by the adder 46 via latch 66 for improper addition to a computation involving the lsb of a succeeding data word X' say. The effect of the multiplexer 60 is to delete this carry whenever a least significant data bit computation is being executed, and for which there should be no lower order computation to generate a carry. Instead, the multiplexer 60 substitutes a carry input signal received from the SIGN latch 52.

When the flag bit f in latch 42 is 0, the carry output signal from $c_o$ of adder 46 is recirculated via the latch 66, multiplexer 60 and line 70 to the adder carry input $c_i$ for addition to a subsequent computation.

The adder 46 adds the three bits appearing at inputs $p_i$, $c_i$ and $s_i$ to produce new sum and carry outputs at $s_o$ and $c_o$ respectively. The sum input at $s_i$ is an intermediate sum bit g output at $s_o$ from a preceding column neighbour cell $12_{i-1,j}$ above where available. For first row multiplier cells having no upper neighbour, g=0 as shown in FIG. 1 at 28 for example. Passage of intermediate sum bits g downwards from cell to cell in this way results in each column of multiplier cells outputting the sum of four intermediate sum bits each computed in accordance with two's complement arithmetic.

The flag bit f is input at 24 in synchronism with input of the leading (and least significant) bit of a data word to uppermost and leftmost cell $12_{05}$. The flag f subsequently passes from latch to latch along the chain 22 and down the columns of the processor 10 via respective input connections $26_5$ to $26_0$.

Each of the latches indicated by Δ symbols in FIG. 1 and latches 42, 44, 66, 84, 86, 94 and 96 (but not 52 and 54) in FIGS. 2 and 3 is activated synchronously by a clock of the kind well known in the art of bit-level systolic arrays. The latches are activated to clock in and subsequently clock out successive bits, and each is activated every clock cycle. Such latches and clocking arrangements have been disclosed in the prior art, and will not be described.

Each accumulator cell 14 is arranged to add successive intermediate sums g received via the line 18 to respective left hand inputs y on the line 21. The inputs y (equal to zero for cell $14_{45}$) undergo a two clock cycle delay at latches 94/96, whereas inputs g experience only a one cycle delay at latch 86. The reason for this will be givwn later. Each y input and recirculating carry output $c_o$ is ANDed with the inverse of the flag bit f at AND gates 98 and 92 respectively. The flag f is normally 0, and its inverse 1, except when an input of the kind $g_{or}$ (r=5 to 0) at 18 is received. In the latter case, the relevant $g_{or}$ has been computed from least significant data bits $x_i^p$ (i=0 to 3). Consequently, the carry input at $c_i$ and the y value at $y_i$ should also be zero. The AND gates 92 and 98 provide for this, since their outputs will be 0 when the inverse of f is 0. As will be clarified later, this provides for two's complement sign extension bits (guard bands) of data words to be inhibited from affecting succeeding unrelated computation results.

Figure 4:
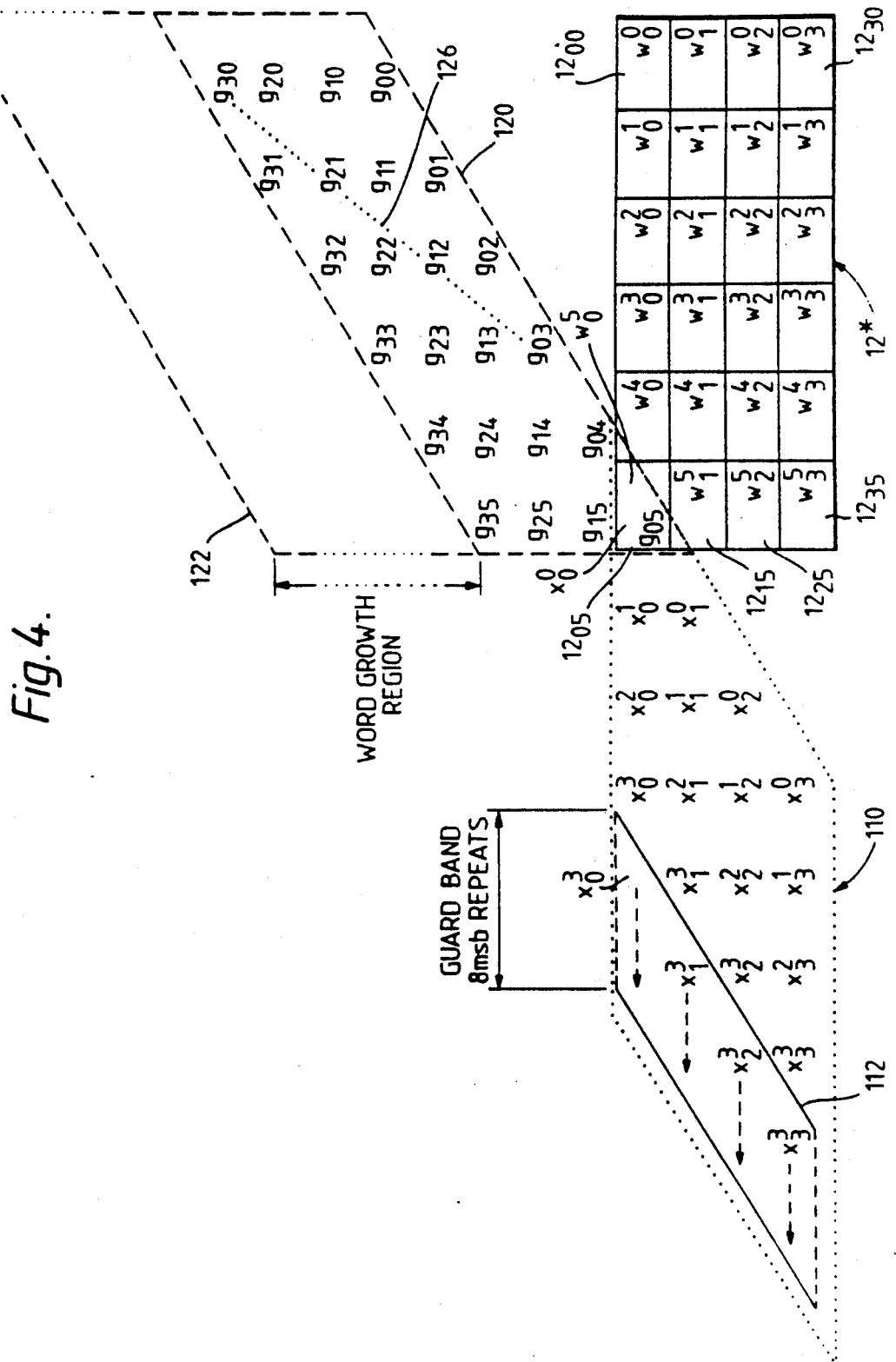
Figure 6:
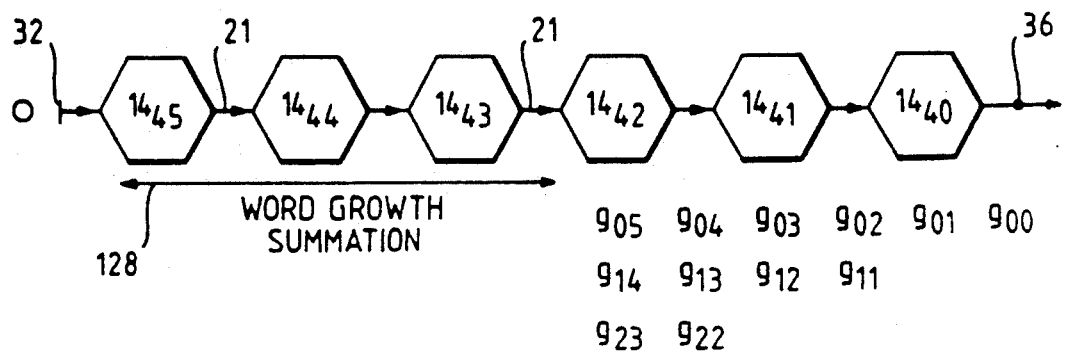
FIG. 6 illustrates timing of result bit formation in the accumulator cell chain of FIG. 1.

The input scheme and timing of operation of the processor 10 will now be described with reference to FIGS. 4, 5 and 6, in which parts previously referred to are like referenced. FIGS. 4 and 5 schematically show the multiplier cell array 12* on the first and sixth clock (or latch activation) cycles. The multiplier cells 12 of the array 12* are illustrated as rectangles with contiguous neighbours to reduce complexity and improve clarity; i.e. interconnections and latches etc are not illustrated. FIGS. 4 and 5 are timing diagrams similar to those employed in the prior art to illustrate systolic array operation. Structure shown other than the array 12* indicates data and result flow rather than apparatus.

Data bits of the kind x are input to the multiplier cell array 12* from the left as indicated within the dotted line parallelogram 110. The bits have subscript and superscript indices q and r respectively, where q, r=0 to 3. The general bit $x_q^r$ is the rth bit of the qth data word $X_q$; i.e. $X_q$ has bits $x_q^0$, $x_q^1$, $x_q^2$ and $x_q^3$, and is input to the (q+1)th row of the multiplier cell array 12*. Each $X_q$ is input to its respective row input $30_q$ (FIG. 1) bit serially, least significant bit (lsb $x_q^0$) leading with a time delay of one clock cycle relative to input of $X_{q-1}$ to the row above (where available). The input time delay consequently increases by one cycle per row down the array 12*, and is indicated diagrammatically by the rightward slanting aspect of the parallelogram 110. The data input scheme to the array 12* is therefore word parallel, since $X_q$ is input in parallel with $X_{q+1}$ etc, bit-serial, lsb leading and bit-staggered in view of the relative time delay. The input bit stagger is imposed by latches 31 in FIG. 1, each of which imposes a one clock cycle delay and which increases in number by one latch per row down the array 12*.

The general input data word $X_q$ has a most significant bit (msb) $x_q^3$ which is repeated eight times to form a two's complement "guard band" 112 (The guard band length can be reduced using additional circuitry as will be mentioned later.) The guard band 112 is illustrated in FIG. 4 in horizontally foreshortened form, but in full in FIGS. 5A and 5B (hereinafter, referred to as FIG. 5). Guard bands are well known in the prior art of systolic arrays, and provide for the increase in numerical magnitude (word length) of output results as they formed in a multiply-accumulate operation. In the present example, and as will be described later, each word $X_q$ of four bits will be multiplied by a six digit coefficient (e.g. digits $W_0^0$ to $W_0^5$ to form a ten bit value, and the value will be added to three other such values to form a result. The number of bits in the result is twelve, this being the sum of the multiplicand lengths plus the logarithm to base 2 of the number of values to be added. This is accommodated by extending each $X_q$ to the full length of the result by replication of its msb $x_q^3$. In contradistinction, in the Baugh-Wooley algorithm, guard bands of zeros are employed as opposed to msb replication.

FIG. 4 shows the array 12* on the first clock cycle of operation when the leading and least significant bit $x_0^0$ of $X_0$ has been clocked into multiplier cell $12_{05}$. Here it is multiplied by the coefficient digit $w_0^5$ to form a product bit $w_0^5 x_0^0$. The sum input g is 0 for cell $12_{05}$. Since $x_0^0$ is an lsb, the flag f input at 24 is 1. Consequently, if $w_0^5$ is negative, its SIGN bit is 1, the product bit $w_0^5 x_0^0$ is inverted and 1 is added as a carry input. This implements the two's complement "invert and add one" rule as previously described. If $w_0^5$ is positive, its SIGN bit is 0; the product $w_0^5 x_0^0$ is therefore not inverted and the carry input on line 70 is 0. The sum and carry inputs and the product bit are added together by the adder 46 in multiplier cell $12_{05}$ to produce sum and carry output bits at $s_o$ and $c_o$ respectively. The carry output bit is recirculated via the latch 66; here it undergoes a one clock cycle delay to become available one clock cycle later as a carry bit for the succeeding computation of the same multiplier cell $12_{05}$. The sum output bit is a first contribution to an intermediate sum bit $g_{05}$ (sum of product bits).

Further contributions to the intermediate sum bit $g_{05}$ are produced on successive clock cycles in the first (leftmost) column of cells. One clock cycle after that shown in FIG. 4, the leading bit $x_1^0$ (lsb) of $X_1$ will be clocked into cell $12_{15}$ to form a product with $w_1^5$. The flag bit $f=1$ and the first contribution to $g_{05}$ will be received from cell $12_{05}$ above, so the SIGN bit and $w_1^5 x_1^0$ or its inverse will be added to the first contribution to produce output sum and carry bits. This continues down the first column until, after four clock cycles, the sum output bit of cell $12_{35}$ represents the lsb of the cascaded accumulation of four contributions to $g_{05}$ computed on successive clock cycles in accordance with two's complement arithmetic; i.e. $g_{05}$ output from cell $12_{35}$ after four clock cycles is given by:

$$g_{05} = lsb[w_0^5 x_0^0 + w_1^5 x_1^0 + w_2^5 x_2^0 + w_3^5 x_3^0] \quad (1)$$

$$\text{ie } g_{05} = lsb \sum_{i=0}^{3} w_i^5 x_i^0 \quad (2)$$

In a similar manner, on the second to fifth clock cycles after that shown in FIG. 4, the second bits $x_0^1$ to $x_3^1$ of $X_0$ to $X_3$ respectively will enter cells $12_{05}$ to $12_{35}$ to provide contributions to a successive partial sum $g_{15}$. However, the flag bit f will be 0, since $x_0^1$ etc are not lsbs. Consequently, cascaded accumulation of $g_{15}$ will involve carry bits generated in the computation of $g_{05}$ and recirculated via delay latches 66 to provide carry inputs $c_i$ instead of SIGN bits. The expression for $g_{15}$ is:

$$g_{15} = lsb \left[ \sum_{i=0}^{3} w_i^5 x_i^1 + \text{carry bits from } g_{05} \text{ computation} \right] \quad (3)$$

Movement of data indicated by parallelogram 110 to the right brings further cell columns into play and effects computation of other intermediate sums of the kind g. Computation timing of terms g is indicated by a parallelogram 120 of chain line sides. The counterpart of the guard band 112 of data parallelogram 110 is a "word growth" region 122 (shown vertically foreshortened) of intermediate sum parallelogram 120. The region 122 accommodates terms such as $g_{45}$, $g_{55}$ etc (not shown) arising from carry bits from preceding computations and products involving repeated msbs in the guard band.

The situation at the end of the sixth clock cycle is illustrated in FIG. 5. Terms $g_{05}$, $g_{15}$ and $g_{04}$ have been computed by the multiplier array 12*, and have emerged from the first and second columns. These columns have begun to compute terms corresponding to the guard band 112 and word growth region 122. Cell $12_{00}$ is in the process of computing the first contribution to $g_{00}$, and terms such as $g_{32}$ and $g_{10}$ have yet to be computed since they are shown above the array 12* prior to entry.

The general coefficient digit $w_i^j$ associated with cell $12_{ij}$ is the jth digit of an ith coefficient word $W_i$; i.e. each $W_i$ has six digits $w_i^5$ to $w_i^0$ located at respective multiplier cells 12 of the (i+1)th row of the array 12* (i=0 to 3). The processor 10 is arranged to carry out computations to provide terms of the kind G given by:

$$G = \sum_{i=0}^{3} W_i X_i \quad (4)$$

To compute G in Equation (4), each bit $x_i^0$ etc of $X_i$ must multiply each digit $w_i^0$ etc of $W_i$, and then products of like bit significance must be summed. Now a bit-level product such as $w_i^1 x_i^2$ has the same bit significance as $w_i^3 x_i^0$, i.e. 3. Consequently, the bit significance of intermediate sums $g_{pq}$ in FIGS. 4 and 5 is $r=(p+q)$, and intermediate sums of like r must be added to form bits $g^r$ of G. In FIG. 4, a dotted line 126 links terms $g_{03}$, $g_{12}$, $g_{21}$ and $g_{30}$ (r=3) as an example of intermediate sums to be added together to form $g^3$, the bit of significance 3 of G. In general, the rth bit $g^r$ of G is given by:

$$g^r = g^{(p+q)} = \quad (5)$$

$$lsb \left[ \sum_{p=0}^{r} g_{r(r-p)} + \text{carry bits from } g^{r-1} \text{ computation} \right]$$

The dotted line 126 in FIG. 4 linking terms of like significance illustrates that these terms are generated with a relative delay of two clock cycles, since the line 126 has twice the slope of the leading edges of parallelograms 110 and 120. In order to add terms of like significance, they must be "realigned in time", i.e. the relative delay must be removed. This is carried out in the accumulator cells $14_{45}$ to $14_{40}$ as shown schematically in FIG. 6. An intermediate sum passes into an accummulator cell 14 from above and experiences a delay of one clock cycle at latch 86. It is added to an incoming sum y delayed by two clock cycles at latches 94 and 96. That part of y input from above to the preceding accummulator cell 14 would have undergone delay at a latch 86 also. Consequently, the delay along the chain of accumulator cells $14_{45}$ to $14_{40}$ is 1, 3, 5, 7 . . . clock cycles. The effect of this is shown in FIG. 6, which illustrates the position of the initial contribution $g_{or}$ (r=0, 1, . . . ) to $g^r$, the rth bit of G on the tenth clock cycle (nine clock cycles after that illustrated in FIG. 4). At this point, $x_3^0$ has been clocked out of cell $12_{30}$; the final contribution to $g_{00}$ has therefore been added to it, and $g_{00}$ has been clocked into accumulator cell $14_{40}$. The value stored on latch 96 (i.e. the y input one cycle earlier to latch 94) is zero. Consequently, $g_{00}$ apears at the output 36 of the accumulator chain providing the only contribution to $g^0$, the lsb of G. At the same instant, $g_{01}$ is on latch 94 of cell $14_{40}$, and will be added one clock cycle later to $g_{10}$ (not shown) to form $g^1$ when $g_{10}$ has been clocked out of multiplier cell $12_{30}$. Similarly, $g_{02}$ has been added to $g_{11}$ in accumulator cell $14_{41}$, and their sum will be added to $g_{20}$ (not shown) in accumulator cell $14_{40}$ two clock cycles later to form $g^2$. The term $g_{05}$ has been added to 0, $g_{14}$ and $g_{23}$ at accumulator cells $14_{45}$, $14_{44}$ and $14_{43}$ respectively, and will be added to $g_{32}$ and word growth terms in cells $14_{42}$ to $14_{40}$ to generate $g^5$. Extending this analysis demonstrates that the general bit $g^r$ ($r = 0$ to 11) of G is available at the accumulator chain output 36 on the $(r+10)$th clock cycle.

Word growth summation is indicated by an arrow 128. This corresponds to addition of carry bits to terms generated by coefficient bits multiplying msb extension or replication bits occupying guard band 112. It leaves unwanted carry bits recirculated on latches 90. Moreover, a full adder 88 receiving a two's complement sign extended input y at 21 will provide a sign extended output y'. This becomes unacceptable after any contribution to the msb $g^{11}$ of G has been computed, because it results in a carry bit and a sign extension bit (corresponding to unwanted $g^{12}$) affecting a contribution to the lsb $g^0$ of a subsequent output result G' say. It is inhibited by the effect of AND gates 92 and 98, which receive input of the inverse of the flag f. When $f = 1$, the AND gates 92 and 98 both receive a zero input from inverting latch output 84, and respond by providing zero outputs irrespective of their second inputs. In consequence, the inputs $y_i$ and $c_i$ of the adder 88 receive 0 whenever the adder 88 is receiving an intermediate sum of the kind $g_{or}$ ($r = 0$ to 5) corresponding to products involving lsb data bits $x_0^0$ to $x_3^0$ and for which there are no earlier computed terms to be added. In effect, a flag bit f of 1 deletes the bits contained in latches 90 (carry bit) and 96 (sign extension bit).

The foregoing analysis demonstrates that the processor 10 directly computes the product G in two's complement digital form given by:

$$G = \sum_{i=0}^{3} W_i X_i \quad (6)$$

where each $X_i$ is a digital number expressed in two's complement form, and each $W_i$ is a number having digits each in the set $-1, 0, 1$ in accordance with Booth's three level encoding algorithm. Unlike prior art processors employing the Baugh-Wooley algorithm, there is no requirement for control bits to mark terms requiring inversion, nor for a correction term to be subtracted from the final result.

The above discussion has concentrated on the production of one result G for convenience of description. In general, the processor 10 is employed to produce successive results, e.g. G(1), G(2), G(3) . . . This is achieved simply by input of successive sets of data words as successive parallelograms 110 in series. The guard band 112 and flag f prevent result overlap as has been said, which would otherwise arise from sign extension of the msb of G(1) overlapping the lsb of G(2) etc for example.

The processor 10 employs data input bits $x_0^0$ etc meeting coefficient digits $w_0^5$ etc in descending order of significance, and a linear chain of accumulator cells 14 is used. It is also possible for coefficient bits to be in ascending order of significance. In this case an adder tree accumulator structure is used, intermediat sums to be added emerge from the multiplier cell array simultaneously instead of with relative delay. This is disclosed in the prior art, and will not be described.

The size of the guard band 112 may be reduced to improve throughput if two accumulator cell chains are employed. These would operate in parallel and compute alternate results, as described in published British Patent Application No. 2,187,579A. In addition, guard bands may be further reduced by modifying the processor 10 to incorporate half adders and multiple accumulators. This is described by R A Evans and R Eames in Electronics Letters, Apr. 23, 1987, Vol 23, No 9, pages 460–461.

The chain 22 of latches provides as has been said for distribution of the flag bit f to individual columns of the processor 10. With equivalent effect, a similar chain may alternatively be provided adjacent the leftmost processor column and connections made for passage of f along rows.

In operation of the processor 10, the least significant bit $x_0^0$ of the leading (uppermost) word $X_0$ is flagged or input synchronously with the flag bit f. In practice, the processor 10 is designed to receive input of a sequence of blocks of data words, i.e. a sequence of parallelograms 110, and to generate a respective result of the kind G for each block. In consequence, each block is input with a respective flag bit, as will have been inferred from the preceding description. The flag input 24 accordingly receives an input signal which is logic 1 on every twelfth clock cycle, and which is logic 0 for each intervening interval of eleven clock cycles. The cells 12 and 14 are arranged to accept a flag bit input of 1 synchronously with least significant data bits $x_1^0$. However, it is quite possible to arrange the cells 12 and 14 to include flag delay latches so that $f = 1$ input would occur at a different point in the twelve-cycle input data word length. For most purposes however, this would increase cell complexity without countervaling benefit.

Figure 7:
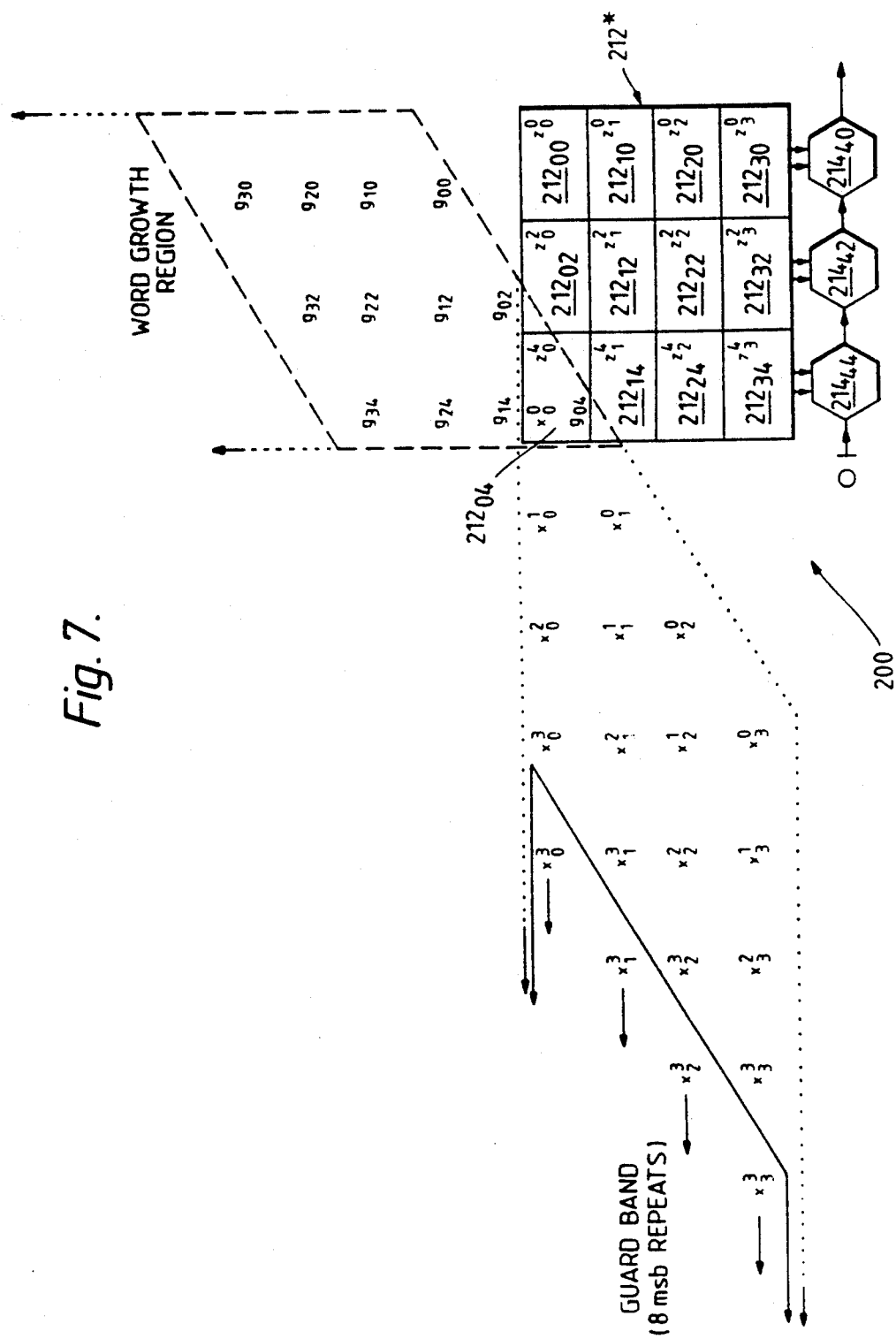
FIG. 7 is a timing diagram illustrating operation of an alternative processor of the invention.

Referring now to FIG. 7, a further processor of the invention is illustrated schematically, and is indicated generally by 200. The processor 200 is arranged to compute G given by:

$$G = \sum_{i=0}^{3} Z_i X_i \quad (7)$$

where $X_i$ has bits $x_i^0$ to $x_i^3$ (0 or 1) as described earlier, and $Z_i$ has digits $z_i^0 z_i^2$ and $z_i^4$ each having a value in the digit set $-2, -1, 0, 1, 2$ in accordance with the Modified Booth's five level (five digit) algorithm. The weight to be applied to the jth digit $z_i^j$ is $2^j$, so $Z_i$ is given in each case by evaluating:

$$Z_i = 2^0 z_i^0 + 2^2 z_i^2 + 2^4 z_i^4 \quad (8)$$

Since each $z_i^j$ has a value in the range $-2$ to 2, $Z_i$ may take any value in the range $-42$ to 42 in decimal notation. This compares with a range of $-63$ to 63 in the earlier exmaple.

The processor 200 is illustrated in schematic form only, and in similar manner to that of FIG. 4. It incorporates cell interconnections, input latches and a flag distribution latch chain (not shown) equivalent to those shown in FIG. 1. In view of these similarities a detailed drawing is not given, and parts equivalent to those previously described are like-referenced with a prefix 200.

The processor 200 incorporates a multiplier array 212* comprising multiplier cells $212_{00}$ to $212_{34}$ arranged in four rows and three columns. The columns are extended by respective accumulator cells $212_{44}$ to $214_{40}$. The cells have column indices which change by 2 between adjacent columns, e.g. cell $212_{12}$ lies between cells $212_{14}$ and $212_{10}$. This indicates that the processor 200 is equivalent to a processor 10 with alternate columns omitted and somewhat reduced coefficient range.

Figure 8:
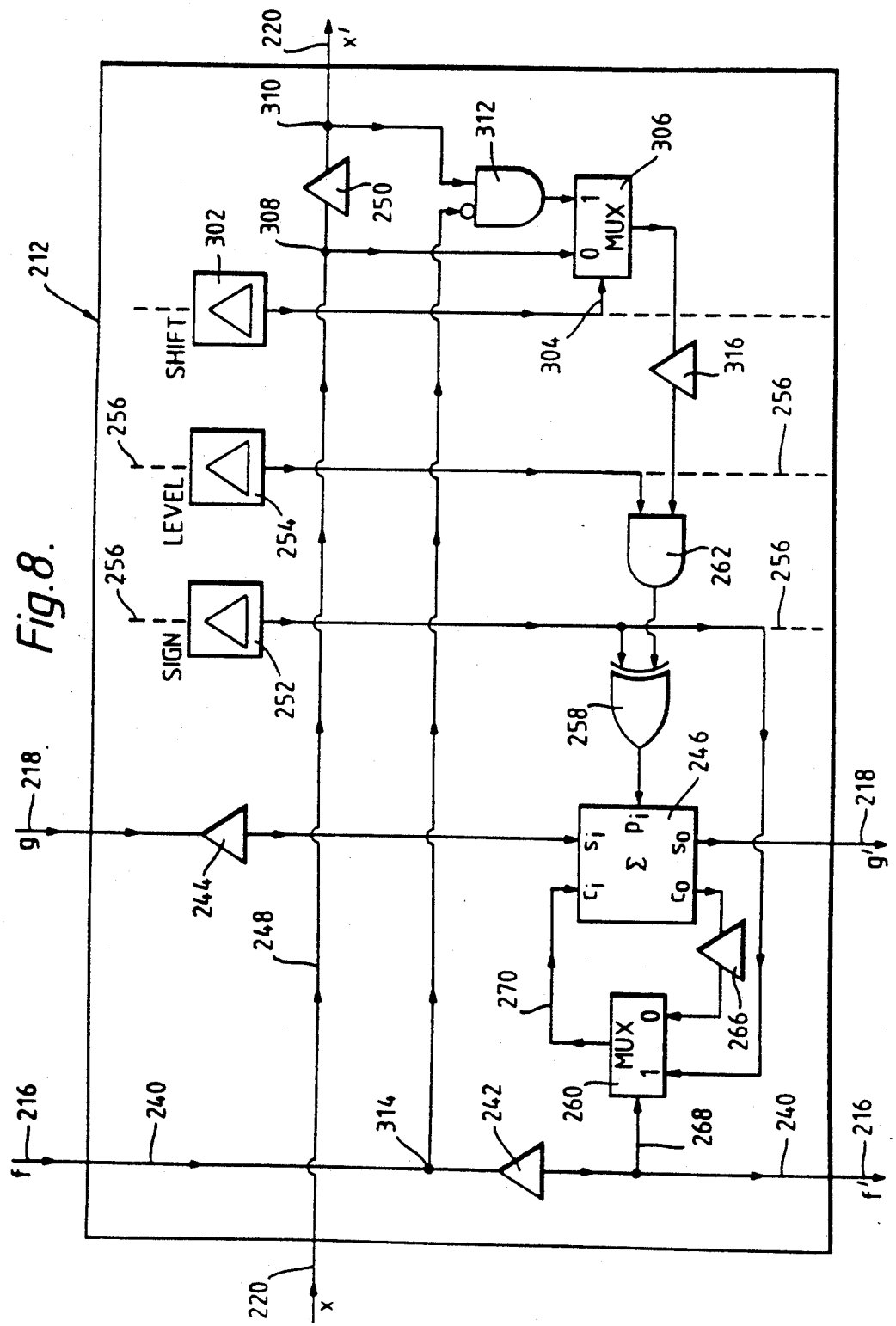
FIGS. 8 and 9 illustrate multiplier and accumulator cells of the kind shown schematically in FIG. 7.
Figure 9:
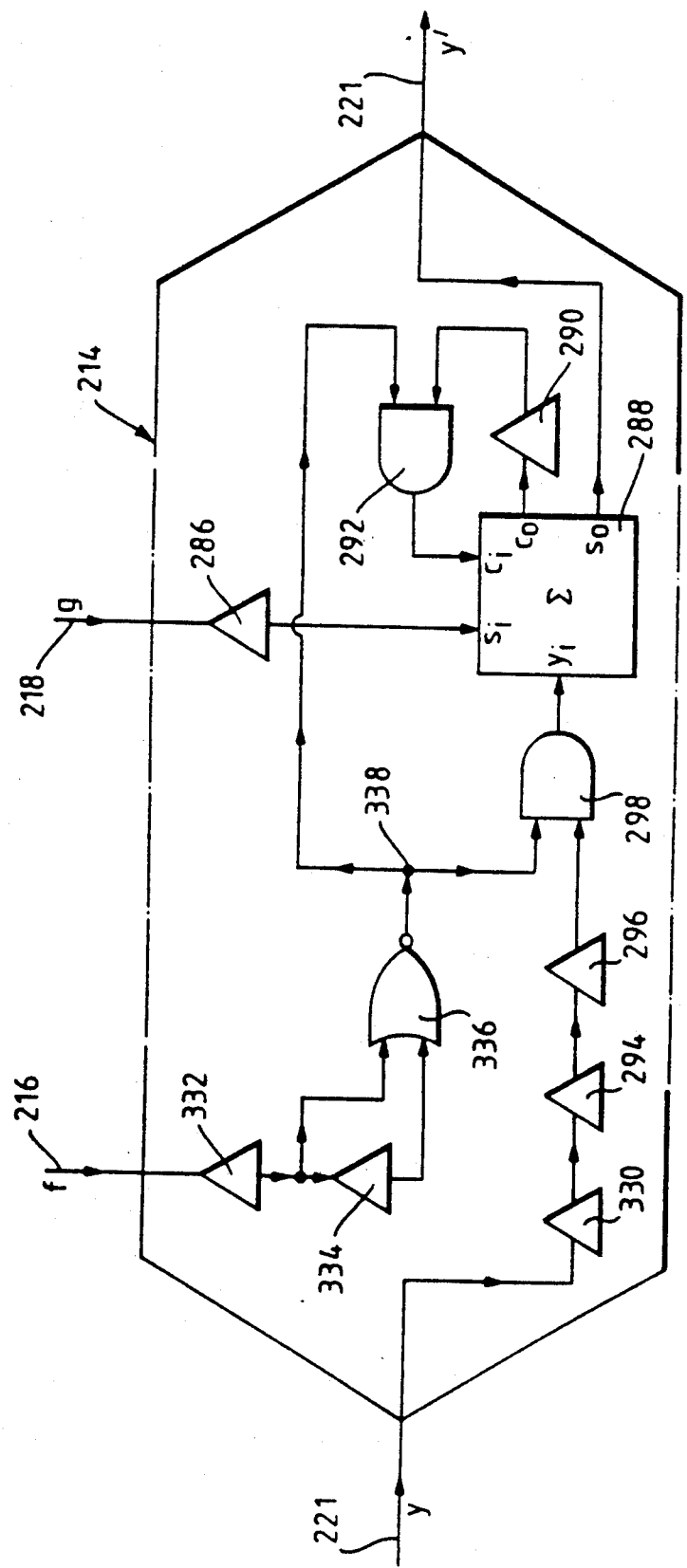

The multiplier and accumulator cells 212/214 are shown in detail in FIGS. 8 and 9 respectively. Parts equivalent to those previously described in FIGS. 2 and 3 are like referenced with a prefix 200. Additional parts are prefixed 300. The cells 212 and 214 are similar to the equivalents described earlier, and in consequence the following description will concentrate on aspects of difference.

The multiplier cell 212 contains an additional coefficient latch 302 referred to as a SHIFT latch. This is connected to a selector input 304 of a second multiplexer 306. The multiplexer 306 has an 0-selected input connected to an input 308 of a data bit latch 250. An output 310 of the latch 250 is connected to a non-inverting input of an AND gate 312, the AND gate output being connected to the 1-selected input of the multiplexer 306. The AND gate 312 has an inverting input connected to a point 314 on a flag line 240, the point 314 lying on an input side of a flag latch 242. Output signals from the multiplexer 306 pass via a clock activated latch 316 to an AND gate 262, this gate also receiving input from a LEVEL latch 256.

Other than elements indicated with prefixes 300, the multiplier cell 212 contains parts equivalent to those previously described for the cell 12 of FIG. 2.

The multiplier cell 212 operates as follows. It is arranged to implement multiplication by a preloaded coefficient digit of the kind $z_i^j$ in the set $(-2, -1, 0, 1, 2)$ expressed by SIGN, LEVEL and SHIFT bits. As in the cell 12, the SIGN latch 252 holds a bit which is 0 or 1 according to whether $z_i^j$ is positive or negative. The LEVEL latch 254 holds a first magnitude bit which is 0 or 1 according to whether $z_i^j$ is zero or non-zero. The SHIFT latch 302 holds a second magnitude bit which is 1 or 0 according to whether or not the magnitude of $z_i^j$ is 2. The five possible values of $z_i^j$ and their corresponding latch bits are set out in Table 1 below.

TABLE 1

| $z_i^j$ | SIGN | LEVEL | SHIFT |
|---|---|---|---|
| −2 | 1 | 1 | 1 |
| −1 | 1 | 1 | 0 |
| 0 | ANY | 0 | ANY |
| 1 | 0 | 1 | 0 |
| 2 | 0 | 1 | 1 |

When the SHIFT bit is 0, $z_i^j$ has values in the range −1, 0, 1 and the multiplier cell 212 operates in substantially the same manner as the cell 12. The SHIFT bit of 0 provides for the second multiplexer 306 to route an incoming data bit x via the latch 316 to the AND gate 262. In this case, the bit x does not undergo delay at the latch 250.

When the SHIFT bit is 1, the second multiplexer 306 routes its 1 selected input to the latch 316. This input is the output of latch 250 ANDed at 312 with the inverse of the flag bit f prior to its input to the flag delay latch 242. The inverse of f at 314 is 0 when a least significant bit x (lsb) of data word X is at 308, at which time a most significant bit (msb, x* say) of a preceding data word X* is at 310. Now x* is a two's complement sign extension bit as in parallelogram 112 of FIG. 4, and its contribution to a succeeding calculation is unwanted as previously described. Consequently, the AND gate 312 provides an output of 0 to multiplexer 306 whenever the input flag bit f at 314 is 1. When f=0, the output of AND gate 312 is equal to the value of x' at 310. A value of f=0 at 314 means that x at 308 is not an lsb, and therefore x' at 310 is any bit from an lsb to a bit one level lower in significance than an msb. The bit x' becomes routed via gate 312, multiplexer 306 and latch 316 to AND gate 262. As compared to the input of a data bit x from 308 when the SHIFT bit is 0, the input of x' when the SHIFT bit is 1 incurs an additional delay of one clock cycle at the data latch 250. The effect of this is described later.

The combination of elements 216 to 270 operate exactly as previously described for their counterparts 16 to 70 of FIG. 2. They collectively implement a two's complement multiply/add function involving multiplication of x by 0 or ±1 stored in the SIGN and LEVEL latches 252/254 and addition to an accumulating sum g. As before, the flag f at 268 is employed in effect to delete an unwanted carry bit at 266 arising from a preceding msb data bit computation. However, the effect of the SHIFT bit at 302 is to control which of two possible (and successive) data bits, $x_i^n$ and $x_i^{n+1}$ say, is to be involved in a product to be added to an accumulating intermediate sum of the kind $g_{pj}$ previously described. If the multiplier cell is the ith row, jth column cell $212_{ij}$ (i=0 to 3, j=0, 2 or 4), it is associated with a coefficient digit $z_i^j$. For clarification purposes, the coefficient digit $z_i^j$ will be redefined as a reduced coefficient digit $z_i^{j'}$ multiplied by (b+1), where b is the value of the SHIFT bit 0 or 1.

$$\text{ie } z_i^j = (b + 1)z_i^{j'} \qquad (9)$$

$z_i^{j'}$ has a value of −1, 0 or 1 expressed by the SIGN and LEVEL bits in latches 252 and 254.

The multiplier cell $212_{ij}$ forms products as previously described for the cell 12; the products effectively involve the reduced coefficient digit $z_i^{j'}$, since only the SIGN and LEVEL bits are directly involved in multiplication at gates 258 and 262. In consequence, a cell $212_{ij}$ forms for addition to $g_{pj}$ a product which, for example, is $z_i^{j'} x_i^n$ or $z_i^{j'} x_i^{n+1}$ according to whether b in Equation (9) is 0 or 1. The bit significance of $g_{pj}$ is (p+j), so adding $z_i^{j'} x_i^n$ to it treats $z_i^{j'}$ as having significance (p+j−n), and adding $z_i^{j'} x_i^{n+1}$ treats $z_i^{j'}$ as having significance (p+j−n−1), one level lower in bit significance. An increase in bit significance of one corresponds to multiplication by 2. This demonstrates that the effect of the SHIFT bit when equal to 1 is equivalent to multiplication by 2, since it introduces what amounts to an increase in coefficient digit significance. This analysis also indicates the need for the gating function of AND gate 312 previously mentioned. If $x_i^{n+1}$ is an lsb, $x_i^n$ does not exist and must be set to zero. The AND gate 312 provides this.

Referring now to FIG. 9, the accumulator cell 214 is shown in more detail, and parts equivalent to those shown in FIG. 3 are like-referenced with a prefix 200. The cell 214 contains parts as described in the cell 14, except that it includes an additional y input latch 330, and inverting flag latch 82/84 is replaced by two latches 332 and 334 in series with outputs connected as inputs to a NOR gate 336. The latches 330, 332 and 334 are clock activated, and the NOR gate has an output 338 providing inputs to AND gates 292 and 298.

The additional y input latch 330 is provided to compensate for the change of two levels of output bit significance (a factor of 4) between adjacent multiplier cell columns. As indicated in Equation (8), coefficient digit $z_i^n$ (n=0, 2 or 4) is treated as multiplied by $2^n$, which changes by $2^2$ per column. The addition of y input latch 330 produces synchronism at adder 288 between a column multiplier cell output g and that produced by its left hand neighbour two clock cycles earlier. The equivalent for the previous accumulator cell 14 was a one clock cycle relative delay to deal with an output bit significance change of 1 per column.

As previously described, it is necessary to deal with the unwanted effects of sign extension and carry bits overlapping between successive results G(n) and G(n+1) say. However, as has been said, the processor 200 is equivalent to a processor 10 with alternate columns removed. In consequence, the provision for deleting unwanted msb extension and carry bits in alternate columns is also absent. To deal with this, the NOR gate 336 provides 0 inputs to AND gates 292 and 298 whenever the flag bit f is 1 at the output of latch 332 or 334; this reduces the output of AND gates 292 and 298 to 0 whenever the adder 288 receives a sum input g at $s_i$ corresponding to least significant data bits, and also whenever the like occurred on the preceding clock cycle. Consequently, unwanted sign extension and carry bits are cancelled for two successive clock cycles.

Referring to FIG. 7 once more, it can be seen that this drawing is very similar to FIG. 4. Differences in arithmetic are accommodated within cells 212 and 214 as described above. Overall timing of operation of the processor 200 to produce results of the kind G is similar to that described with reference to FIGS. 4 to 6, and will not be discussed further.

As has been said, the processor 200 employs coefficients in the range −42 to +42, as compared to −63 to +63 for the processor 10 having twice as many cells. The processor 200 may however be extended with a fourth column of cells to cover the coefficient range −170 to +170, which greatly exceeds that of the processor 10 of six columns. This demonstrates the greater efficiency of the processor 200.

The processors 10 and 200 have been described in forms suitable for computing quantities of the kind G each comprising a sum of data word/coefficient word products (in Equations (4) and (7)). If the relevant accumulator chain is omitted from each processor 10 or 200, the remaining circuit may be employed for executing matrix-vector computations. In the case of a device based on the processor 10, the matrix is restricted to matrix elements −1, 0 or 1, whereas an equivalent based on the processor 200 would have matrix elements in the set −2, −1, 0, 1 and 2. British Patent No. 2,168,509B describes matrix-vector multiplication in a related device, and illustrates the timing of circuit operation. This will therefore not be described.

Figure 10:
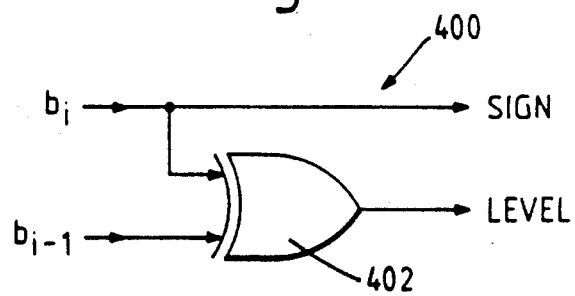
FIGS. 10 and 11 show circuits for converting numbers in two's complement form to Booth's three and five level format respectively.
Figure 11:
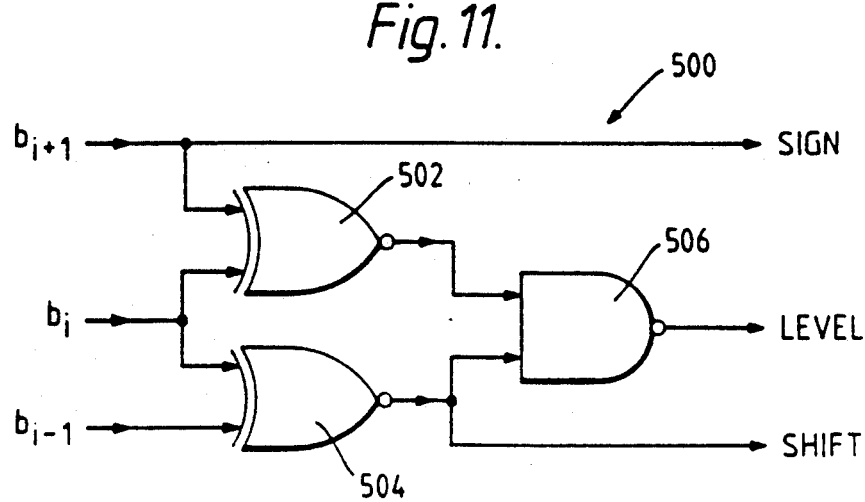

Referring now to FIGS. 10 and 11, there are shown circuits 400 and 500 for recoding binary digital numbers in two's complement form to Booth's algorithm three (−1, 0, 1) and five (−2, −1, 0, 1, 2) level formats respectively. In both cases, the relevant two's complement number to be recoded has N individual bits of the kind $b_i$ (i=0 to N−1) each with conventional values 0 or 1. In the circuit 400, the SIGN bit of the ith recoded digit is equal to the ith bit $b_i$. The LEVEL bit of the ith recoded digit is produced by an EXOR gate 402 receiving input of $b_i$ and $b_{i-1}$; for i=0, $b_{i-1}$ is treated as 0. The circuit 400 recodes each bit $b_i$ by comparing it with the corresponding bit $b_{i-1}$ one level lower in bit significance.

The five-level recoding circuit 500 incorporates first and second EXNOR gates 502 and 504, together with a NAND gate 506. The ith SIGN bit is equal to $b_{i+1}$, the (i+1)th two's complement bit. The ith SHIFT bit is produced by EXNORing $b_i$ with $b_{i-1}$ at 504. The ith LEVEL bit is obtained by EXNORing $b_i$ with both $b_{i+1}$ and $b_{i-1}$ at 502 and 504 respectively, and then the two EXNOR output signals are NANDed at 506. The ith LEVEL bit is the output of the NAND gate 506.

Booth's algorithm is disclosed by A. D. Booth in Quart. Journal of Mech. and Applied Math., Vol IV, Part 2, 1951, pp 236–240. The Modified Booth's algorithm was suggested by O. L. McSorley in "High Speed Arithmetic in Binary Computers", Proc IRE, Vol 49, pp 67–71, January 1961.

We claim:

1. A digital processor for two's complement computations, and wherein:
   (a) the processor includes an array of multiplier cells each arranged to receive input data, carry and cumulative sum bits, to compute new cumulative sum and carry bits corresponding to addition of the input sum and carry bits to a product of the input data bit and a respective coefficient, to output the data bit and the computed cumulative sum bit, and to output the computed carry bit for addition in subsequent computation,
   (b) the cells are connected to form rows and columns by interconnection lines containing clock-activated latches for bit storage and advance, the lines and latches providing for computed cumulative sum bits to move down columns and data bits to move along rows,
   (c) the processor includes data input means for bit serial input of data words to respective rows with input delay increasing down the array,
   (d) the cells are responsive to a respective flag bit input with each data word and indicating least significant bit occurrence,
   (e) each cell includes a storage means for a coefficient digit encoded in the form of a sign bit and at least one magnitude bit, and each cell includes multiplicative gating means responsive to the sign and magnitude bits, and means responsive to the flag bit for controlling the input carry bit value in accordance with the sign bit in computations involving least significant data bits.

2. A processor according to claim 1 wherein each cell's coefficient is a digit encoded and stored in the form of a sign bit and two magnitude bits consisting of a level bit and a shift bit, and wherein each respective multiplicative gating means is responsive to the sign and level bits for product generation, to the shift bit for selection of multiplicand data bit significance, and to flag bit for elimination of unwanted products involving input data sign extension bits.

3. A processor according to claim 1 wherein each multiplier cell includes a combination of AND and EXOR gating means, responsive to said input data bit, magnitude bit and sign bit, for providing a product bit for addition to the input sum and carry bits.

4. A processor according to claim 3 wherein each multiplier cell includes multiplexing means, responsive to the respective input flag bit, for substituting the sign bit for the input carry bit in computations involving least significant data bits.

5. A processor according to claim 1 wherein each multiplier cell includes multiplexing means, responsive to the respective input flag bit, for substituting the sign bit for the input carry bit in computations involving least significant data bits.

6. A digital processor for two's complement computations, and wherein:
   (a) the processor includes an array of multiplier cells each arranged to receive input data, carry and cumulative sum bits, to compute new cumulative sum and carry bits corresponding to addition of the input sum and carry bits to a product of the input data bit and a respective coefficient, to output the data bit and the computed cumulative sum bit, and to output the computed carry bit for addition in subsequent computation,
   (b) the cells are connected to form rows and columns by interconnection lines containing clock-activated latches for bit storage and advance, the lines and latches providing for computed cumulative sum bits to move down columns and data bits to move along rows,
   (c) the processor includes data input means for bit serial input of data words to respective rows with input delay increasing down the array,
   (d) the cells are responsive to a respective flag bit input with each data word and indicating least significant bit occurrence,
   (e) each cell includes a storage means for a coefficient digit encoded in the form of a sign bit and at least one magnitude bit, and each cell includes multiplicative gating means responsive to the sign and magnitude bits, and means responsive to the flag bit for controlling the input carry bit value in accordance with the sign bit in computations involving least significant data bits, said processor further includes accumulating means arranged to add computed cumulative sum bits of like bit significance output from different array columns to form result bits, the accumulating means being responsive to input of each flag bit to implement deletion of unwanted carry and sum bits corresponding to result bits of unnecessarily high significance.

7. A processor according to claim 6 wherein (a) the accumulating means comprises one accumulator cell per column,
   (b) each accumulator cell includes a full adder arranged to add output from its column to that received with relative delay from a neighbouring accumulator cell and to provide input to a second neighbouring accumulator cell where available in each case, and
   (c) the full adder has gated inputs responsive to each flag bit to provide for deletion of unwanted bits.

8. A processor according to claim 7, wherein each multiplier cell includes a combination of AND and EXOR gating means responsive to said input data bit, magnitude bit and the sign bit, for providing a product bit for addition to the input sum and carry bits.

9. A processor according to claim 7, wherein each multiplier cell includes multiplexing means responsive to the respective flag bit input and arranged to substitute the sign bit for the input carry bit in computations involving least significant data bits.

10. A processor according to claim 6 wherein each multiplier cell includes multiplexing means, responsive to the respective input flag bit, for substituting the sign bit for the input carry bit in computations involving least significant data bits.

11. A processor according to claim 6 wherein each multiplier cell includes a combination of AND and EXOR gating means, responsive to said input data bit, magnitude bit and sign bit, for providing a product bit for addition to the input sum and carry bits.

* * * * *